United States Patent [19]

MacKew

[11] Patent Number: 4,815,177
[45] Date of Patent: Mar. 28, 1989

[54] AUTOMATIC TIME-DELAYED RELEASE BUCKLE

[76] Inventor: James MacKew, 1221 Westbury Dr., Mobile, Ala. 36609

[21] Appl. No.: 153,981

[22] Filed: Feb. 9, 1988

[51] Int. Cl.⁴ .................. A44B 11/25; B60R 21/10
[52] U.S. Cl. ................................. 24/602; 24/603; 280/801
[58] Field of Search .............. 24/602, 603; 280/801; 244/151 R; 297/468, 470; 180/268, 270; 251/94

[56] References Cited

U.S. PATENT DOCUMENTS

| | | | |
|---|---|---|---|
| 3,855,674 | 12/1974 | Thiel | 24/602 |
| 3,952,381 | 4/1976 | Barbe . | |
| 3,963,090 | 6/1976 | Hollins | 24/603 |
| 4,072,348 | 2/1978 | Auer | 297/470 |
| 4,126,919 | 11/1978 | Lassche | 24/602 |
| 4,162,715 | 7/1979 | Coulombe . | |
| 4,205,820 | 6/1980 | Bray | 251/94 |
| 4,228,568 | 10/1980 | Frost et al. | 244/151 R |
| 4,441,236 | 4/1984 | Bron . | |
| 4,574,911 | 3/1986 | North | 280/801 |
| 4,589,172 | 5/1986 | Hoenigs et al. | 24/603 |
| 4,637,101 | 1/1987 | Fiedler | 24/602 |

FOREIGN PATENT DOCUMENTS

| | | | |
|---|---|---|---|
| 2404342 | 7/1975 | Fed. Rep. of Germany . | |
| 1568900 | 5/1969 | France . | |
| 2309248 | 11/1974 | France . | |
| 2310776 | 5/1975 | France . | |
| 2318332 | 7/1975 | France . | |
| 2414339 | 9/1979 | France . | |
| 1441475 | 6/1976 | United Kingdom | 24/602 |

Primary Examiner—Victor N. Sakran
Attorney, Agent, or Firm—Albert L. Jeffers; Richard L. Robinson

[57] ABSTRACT

An automatic release buckle assembly including a mating buckle and latch tongue. A resiliently biased tongue latch engages the latch tongue to prevent withdrawal of the latch tongue from the buckle. A manually operable release mechanism is provided for causing the tongue latch to disengage the latch tongue to permit withdrawal of the latch tongue from the buckle. An automatic release device causes the tongue latch to disengage the latch tongue and includes an element movable between first and second positions where in the second position the tongue latch is disengaged from the latch tongue. A support is provided for supporting the movable element in the first position and a resilient element is provided for urging the movable element from the first position to the second position when the movable element becomes unsupported in the first position. An actuating mechanism connected to a portion of the safety belt causes the movable element to become unsupported in the first position in response to tension in the safety belt in excess of a predetermined limit. A timing element is provided for retarding movement of the movable element from the first position to the second position. The timing element includes a first variable volume chamber containing a fluid and engaging the movable element. The fluid is pressurized as the movable element moves from the first position to the second position. A second variable volume chamber is in flow communication with the first variable volume chamber and hermetically sealed therewith. A porous element is disposed between the first and second variable volume chambers, the porous element having a multitude of tortuous flow paths therethrough and serving as a flow restrictor which is not readily obstructed by contaminants in the fluid.

9 Claims, 3 Drawing Sheets

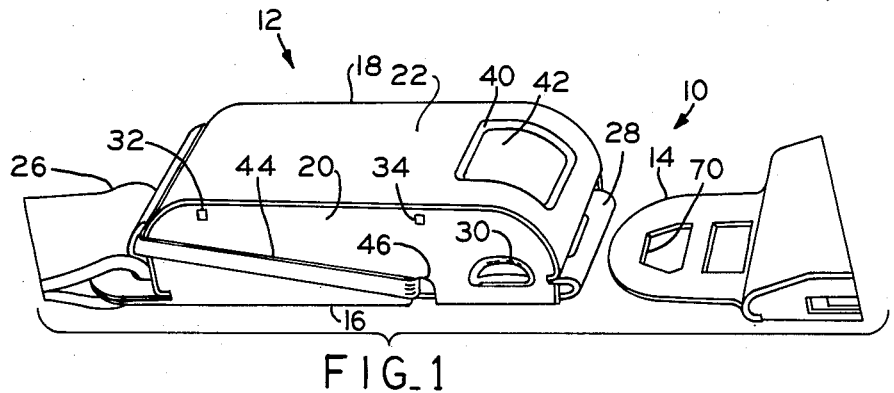
FIG_1
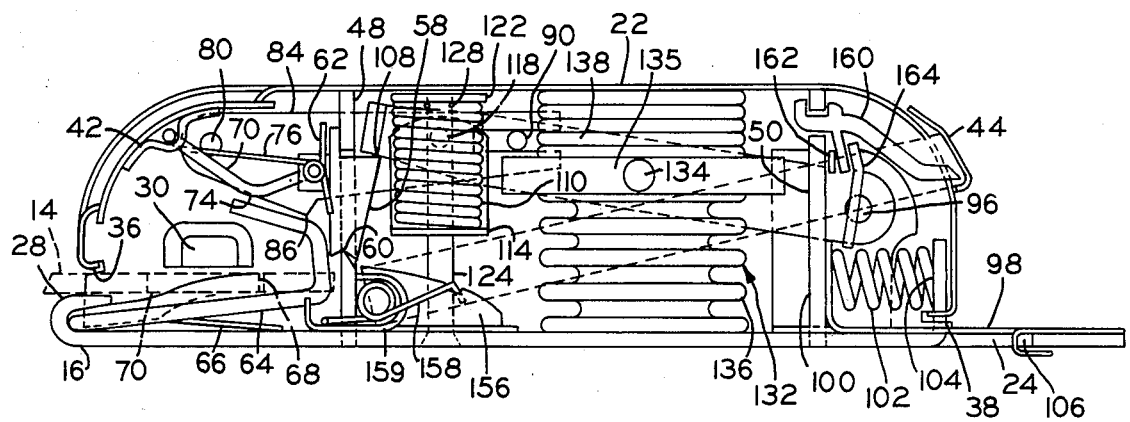
FIG_2
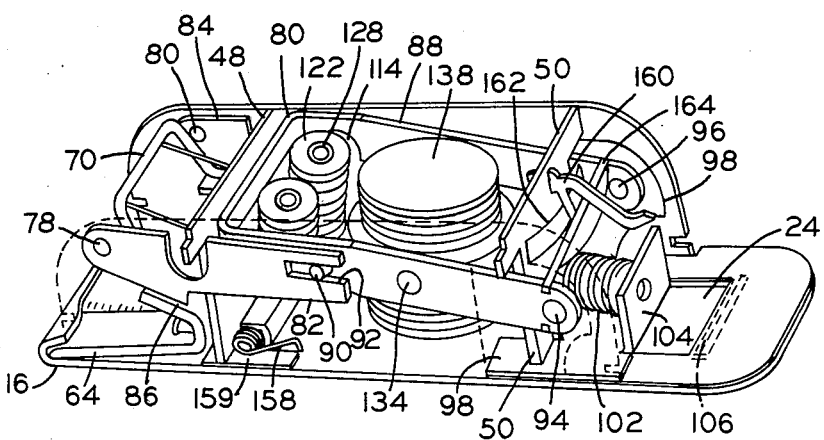
FIG_3

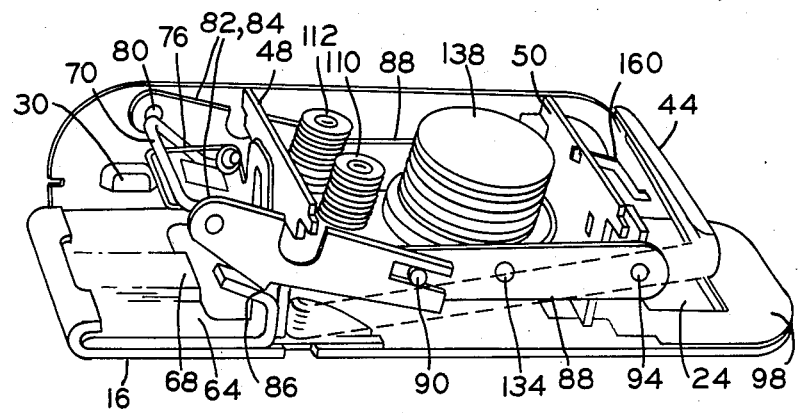
FIG_4
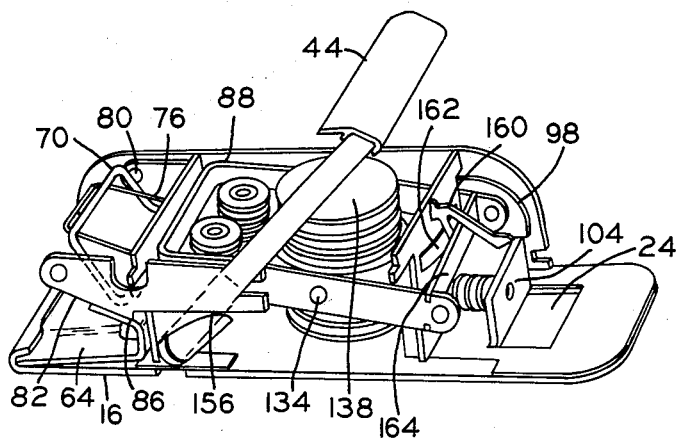
FIG_5
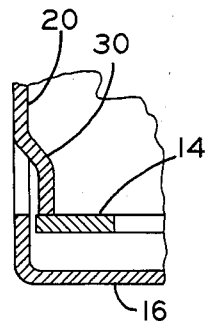
FIG_6
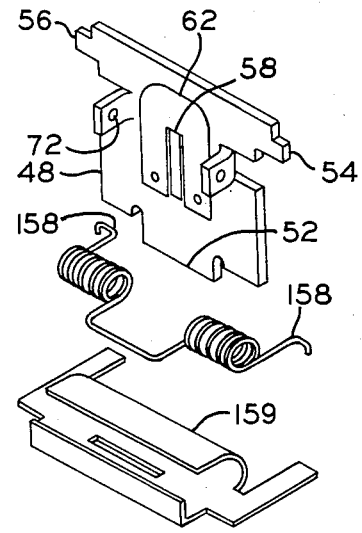
FIG_7

AUTOMATIC TIME-DELAYED RELEASE BUCKLE

BACKGROUND OF THE INVENTION

The present invention relates generally to buckle assemblies for use with safety seat belts and, more particularly, to such buckle assemblies which disengage automatically after a time delay in the event of a collision.

Since front seat safety lap belts became standard equipment on all American-made automobiles in 1964, a significant portion of the public has been resistant to using such safety belts In recognition of the relatively low rate of utilization of seat belts, and considering the savings in lives and money which result from the use of seat belts, legislation has, at various times, been proposed in which alternative safety restraints, such as air bags, would be required as standard equipment in automobiles. The principle idea behind such proposals has been that of providing vehicles with safety restraint systems which operate independently of the voluntary cooperation of the driver or occupant. Unfortunately, such systems, particularly air bags, are considerably more expensive to implement than conventional seat belts.

Many people refrain from using seat belts out of fear that they will become trapped by the belts in the event of a collision and be unable to escape from the vehicle if unnecessary. Consequently, it has been proposed that seat belts be designed so as to release automatically after a certain time delay following a collision. Various designs for such automatically releasing seat belts have been proposed using a variety of mechanical, electrical and hydraulic release and timing mechanisms.

One of the most promising concepts for providing the time delay feature of an automatically-releasing safety belt is the use of a hydraulic fluid flowing under pressure through a restriction as the primary timing means. Typically, this involves a dashpot-type device with either a fixed orifice or one that can be adjusted by means of a needle valve.

The principle problem with the use of hydraulic flow control mechanisms using an orifice as a means of mechanical restriction is that they are severly affected by the presence of contaminants introduced during the manufacturing process, unless very elaborate means are provided, such as clean room conditions with accompanying precautions, which is costly and time consuming. It would be desirable to provide an automatically-releasing safety belt using a controlled flow hydraulic mechanism as the timing element which can be produced at relatively low cost and which is free from failure caused by contaminants introduced into the mechanism either during manufacture or later during field use.

SUMMARY OF THE INVENTION

One aspect of the present invention involves an automatic time delayed release buckle utilizing a hydraulic timing cell. The timing cell includes two variable volume chambers with a flow restriction device therebetween with the entire assembly being hermetically sealed with a fixed amount of hydraulic fluid contained therein. Upon actuation of the automatic release mechanism, a controlled force is applied to the chamber which initially contains the hydraulic fluid, thereby pressurizing the fluid. Pressurized fluid flows through the flow restriction device at a controlled rate into the other variable volume chamber. The relative change in volume of the two chambers and the physical displacement of their junction relative to one another can be utilized to actuate a mechanism which disengages the buckle. A key feature of the flow restriction device is the use of a porous material of relatively large area, as opposed to a single small diameter orifice. This feature solves the problems discussed above with respect to prior hydraulic timing mechanisms in that a porous element of relatively large surface area is not readily obstructed by a slight amount of contamination in the hydraulic fluid. Furthermore, because the fluid is always contained within one or the other of two variable volume chambers which are hermetically sealed together, the entrance of contaminants into the timing cell after manufacture is eliminated.

The invention, in a preferred embodiment thereof, involves an automatic release buckle assembly having means for automatically releasing the buckle assembly after a time delay following an application of tension to the buckle in excess of a predetermined limit. In combination therewith is a first variable volume chamber containing a fluid and a second variable volume chamber in flow communication with the first variable volume chamber and hermetically sealed therewith. A porous element is disposed between the first and second variable volume chambers providing a flow communication pathway from the first variable volume chamber to the second variable volume chamber. Means are provided for pressurizing the fluid in the first variable volume chamber.

One advantage of the present invention is that the use of a porous element as a fluid flow restrictor means in lieu of an orifice eliminates the problem of foreign matter interfering with the rate of flow. Any foreign matter that may be present in the system will have an infinitesimal effect on the rate of flow due to the large number of pores available over the surface area of the porous element.

A further advantage of the present invention results from the use of two closed variable volume chambers with the flow control element therebetween and the whole assembly hermetically sealed together with a fixed amount of hydraulic fluid therein thereby eliminating the problem of foreign matter entering the timing cell or fluid being lost from the timing cell after manufacture.

Further advantages of the invention will become apparent from the following descriptions and drawings.

BRIEF DESCRIPTION OF THE DRAWINGS

FIG. 1 is a perspective view of a buckle assembly constructed in accordance with the present invention.

FIG. 2 is an elevational view partly in section of the buckle assembly of FIG. 1.

FIG. 3 is a perspective view of the buckle assembly of FIG. 1 with one side wall and the top cover removed to reveal the internal components. The automatic release mechanism is set and ready delayed action release.

FIG. 4 is a perspective view of the buckle assembly of FIG. 1 with one side wall and the top cover removed to reveal the internal components. The automatic release mechanism is shown in its fully actuated configuration after the buckle has been fully released.

FIG. 5 is a perspective view of the buckle assembly of FIG. 1 with one side wall and the top cover removed to reveal the internal components. The automatic release mechanism has been reset to the orientation of FIG. 3 by means of a reset lever shown in the raised position.

FIG. 6 is a sectional view of a portion of one side wall of the buckle assembly of FIG. 1.

FIG. 7 is an exploded perspective view of a front inner wall and related components of the buckle assembly of FIG. 1.

DESCRIPTION OF THE PREFERRED EMBODIMENT

Figure 8:
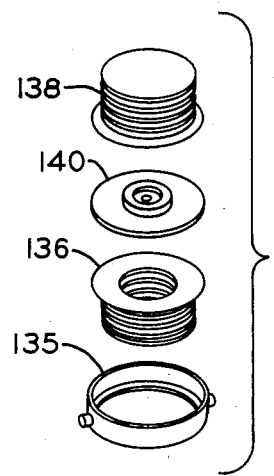
FIG. 8 is an exploded perspective view of the timing cell of the buckle assembly of FIG. 1.

Referring to the figures, there is illustrated a seat belt buckle assembly 10 constructed in accordance with the present invention. Buckle assembly 10 includes buckle 12 and a mating latch tongue 14. Buckle 12 has a main frame including a flat bottom wall 16, upright side walls 18 and 20, and a top cover 22. Bottom wall 16 is provided at one end with a slot 24 for the receipt of stationary safety belt 26, and at the other end with an upwardly curled lip 28 which serves as a lower support for latch tongue 14. Side wall 20 is provided with an upper tongue support 30 for latch tongue 14 which comprises an inward protrusion of side wall 20. Referring particularly to FIG. 6, upper tongue support 30 is shown in cross-section in engagement with latch tongue 14. Opposite side wall 18 is provided with a corresponding upper tongue support. Side wall 20 is also provided with ear slots 32 and 34 for receiving the ears of inner walls disposed between side walls 18 and 20 and described further below. Side wall 18 is likewise provided with corresponding ear slots. Top cover 22 is retained by a front support slot 36 and a rear support slot 38 in side wall 20, and by corresponding support slots in side wall 18. An aperture 40 in top cover 22 provides access to manual release button 42. A U-shaped reset lever 44 is pivotally mounted in a bearing aperture 46 in side wall 20, and a corresponding bearing aperture is provided in side wall 18.

Buckle 12 is generally divided interiorly into three compartments by a front inner wall 48 and a rear inner wall 50. Front inner wall 48 (shown most clearly in FIG. 7) includes a downwardly extending tongue 52 which is received in a corresponding slot in bottom wall 16, and a pair of horizontally extending ears 54 and 56 which are received in ear slot 34 in side wall 20 and the corresponding ear slot in side wall 18, respectively.

A yoke holding pawl 58 (whose function is described further below) is received within a vertical slot in front inner wall 48. Pawl 58 is notched at lower end 60 for pivotal engagement with the bottom of the vertical slot. A leaf-type pawl spring 62 is riveted at the lower end to front inner wall 48 and biases pawl 58 inwardly toward the center compartment of buckle 12.

Latch tongue 14 is retained securely within buckle 12 by tongue latch 64 which is pivotally retained at the front end by upwardly curled lip 28 and is retained against rearward displacement by front inner wall 48. Leaf spring 66 biases tongue latch 64 upwardly. A ramp-like center protrusion 68 in tongue latch 64 is received within aperture 70 of latch tongue 14, preventing withdrawal of latch tongue 14. Upper tongue support 30 prevents upward displacement of latch tongue 14 which otherwise could result in disengagement.

Manual release of latch tongue 14 from buckle 12 is effected by pressing down manual release button 42 which causes manual release lever 70 to pivot downwardly about bearings 72 (FIG. 7) of front inner wall 48. Tongue latch 64 is contacted by release lever 70 at point 74 and displaced downwardly against bias spring 66 until center protrusion 68 clears aperture 70, whereupon latch tongue 14 can be withdrawn. An auxiliary spring 76 biases manual release button 42 upwardly.

The components of buckle 12 described above are primarily related to the normal manual engagement and disengagement of latch tongue 14 with buckle 12. Described below are additional components of buckle 12 which provide automatic time-delayed disengagement of latch tongue 14 from buckle 12 in the event of an application of excessive tension to the seat belt, such as might occur in a collision.

Pivotally mounted to pivot pins 78 and 80 of side walls 18 and 20, respectively, are a pair of automatic release levers 82 and 84. When pivoted downwardly by the automatic release mechanism described below, automatic release levers 82 and 84 engage tongue latch 64 at point 86 and cause a downward displacement thereof in a manner similar to that provided by manual release lever 70 described above, resulting in disengagement of latch tongue 14 from tongue latch 64. The relative movements of automatic release levers 82 and 84 and tongue latch 64 can be seen most clearly by comparing FIGS. 3 and 4.

Automatic release levers 82 and 84 are pivoted downwardly by a generally U-shaped main yoke 88 acting through drive studs 90 received within a longitudinal slot 92. Main yoke 80 is supported at the rear end thereof by pivot pins 94 and 96 which are mounted to main yoke carrier plate 98. Carrier plate 98 slidably engages bottom wall 16 and has a spring support portion 100 which is normally biased forwardly against rear inner wall 50 by release limit spring 102 which is supported at the rear end thereof by limit spring support 104. Limit spring support 104 is integral with bottom wall 16. The rearward travel limit of carrier plate 98 is defined by gap 106 between the rear end surface of aperture 24 and carrier plate 98.

Main yoke 88 is normally supported at the front end thereof by pawl 58 at contact point 108. The front end of main yoke 88 is biased downwardly by a pair of main springs 110 and 112 whose lower ends are carried by a spring saddle 114 pivotally hung from main yoke 88 by trunnion pins 116 and 118. The upper ends of main springs 110 and 112 are retained by spring retainers 120 and 122 secured to spring retainer rods 124 and 126 by snap rings 128 and 130. Spring retainer rods 124 and 126 have flared bottom ends received in correspondingly shaped apertures in bottom wall 16.

In the event that tension is applied to the portion of the seat belt which passes through slot 24 of sufficient magnitude to move carrier plate 98 rearwardly against the bias of release limit spring 102, main yoke 88 will correspondingly be moved rearwardly such that the front end thereof is displaced rearwardly of pawl contact point 108, and main yoke 88 will be urged downwardly by main springs 110 and 112. Drive studs 90 then actuate the automatic release levers 82 and 84. It should be noted that gap 106, described above, is of only the width necessary to permit main yoke 88 to be moved off of pawl 58. Thereafter, any tension in belt 26 in excess of that necessary to effect such movement is carried by the main frame bottom wall 16. Consequently, the automatic release mechanism does not carry the tension load and is unimpeded by such during operation.

A time delay in the downward motion of main yoke 88 is provided by timing cell 132 which is connected to main yoke 88 by trunnion pins 134. Timing cell 132 includes a main frame 135, a high pressure bellows 136, a low pressure bellows 138 and additional internal components described below. High pressure bellows 136 contain a hydraulic fluid, preferably silicone, which becomes pressurized when main yoke 88 is released from pawl 58 and is urged downwardly by main springs 110 and 112. Under such conditions, high pressure bellows 136 is compressed between timing cell main frame 135 and bottom wall 16. Fluid communication is provided between high pressure bellows 136 and low pressure bellows 138, with flow restriction means provided so that main yoke 88 descends slowly at a predetermined rate as fluid is slowly displaced from high pressure bellows 136 to low pressure bellows 138.

Figure 9:
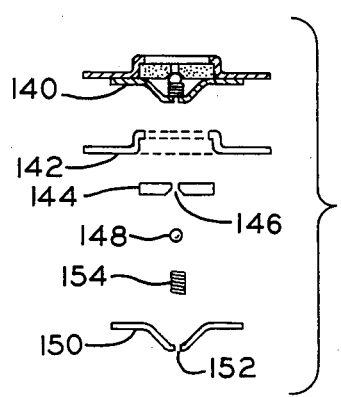
FIG. 9 is an elevational exploded view of the internal components of the timing cell of FIG. 8.

Referring in particular to FIGS. 8 and 9, the internal components of timing cell 132 are illustrated. Sandwiched between high pressure bellows 136 and low pressure bellows 138 is an inner assembly 140, all of which are hermetically sealed together by main frame 135. Inner assembly 140 includes a separating wall 142 into which is press-fit a porous disk element 144 having an aperture 146 therethrough, with the end of aperture 146 which faces high pressure bellows 136 having a tapered seat for receiving a check valve ball 148. A retainer 150 is secured at its periphery to separating wall 142 and has a central aperture 152 aligned with aperture 146. Retainer 150 serves the dual function of retaining disk element 144 within separating wall 142 and also holding check valve ball spring 154 in place.

Porous disk element 144 is preferably made of compressed and sintered powdered brass which characteristically has a multitude of tortuous, small cross-section, porous pathways therethrough which allow for the slow passage of fluid under pressure. An advantage of such a porous element as a fluid flow control means over a single orifice is that the porous element is much less susceptible to becoming clogged by foreign particles which may be accidentally introduced into the timing cell during assembly. Consequently, the timing cell can be manufactured without unusual "clean room" precautions, thereby lowering the cost of manufacture considerably. Alternatively, porous disk element 144 could be made of other sintered metal powders or a ceramic material having similar porosity characteristics.

It has been noted that sintered brass may be rendered non-porous at the tapered check valve ball seat by simple machining of the aperture, which action "smears" the brass particles together into an impervious surface which provides a good sealing valve seat.

Referring particularly to FIG. 5, reset lever 44 is shown raised for the purpose of resetting the automatic release mechanism after actuation. Cam 156, which is biased downwardly by spring 158 located in spring retainer 159 (FIG. 7), moves upwardly as reset lever 44 is manually raised, thereby engaging and raising main yoke 88 to its normal position atop pawl 58. Since the mechanism is reset at a time when there is no longer tension on the seat belt, release limit spring 102 will have pushed main yoke 88 to its forwardmost position. Therefore, as main yoke 88 is raised, it engages the rear surface of pawl 58 which yields pivotally under bias from spring 62 until main yoke 88 clears pawl 58, at which time pawl 58 snaps rearwardly under the front end of main yoke 88. As reset lever 44 and main yoke 88 are raised, fluid is transferred quickly from low pressure bellows 138 to high pressure bellows 136 via the check valve provided by ball 148.

Figure 10:
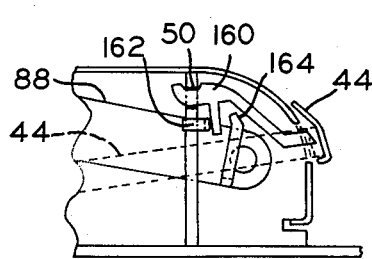
FIGS. 10 and 11 show a partial elevational view partly in section of the buckle assembly of FIG. 1 particularly showing the recent lever-retaining mechanism.
Figure 11:
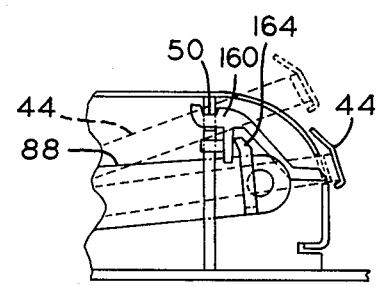

It should be noted that once the automatic release mechanism is reset, release lever 44 is returned to its rest position by spring 158. Reset lever latch 160, pivotally mounted in rear inner wall 50, latches reset lever 44 in the rest position due to bias leaf spring 162 disposed between rear inner wall 50 and reset lever latch 160. Latch retract arm 164, which is attached to main yoke 88, retracts reset lever latch 160 when main yoke 88 is in the down (released) orientation, allowing reset lever 44 to be raised. (See FIGS. 10 and 11).

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. An automatic release buckle assembly for use with a safety belt having first and second portions, comprising:

a latch tongue having means for connection to said first portion of said safety belt;

a buckle having means for connection to said second portion of said safety belt, said buckle including:

resiliently biased tongue latch means for engaging said latch tongue to prevent withdrawal of said latch tongue from said buckle;

manually operable release means for causing said tongue latch means to disengage said latch tongue to permit withdrawal of said latch tongue from said buckle;

automatic release means for causing said tongue latch means to disengage said latch tongue to permit withdrawal of said latch tongue from said buckle, said automatic release means including:

a movable element movable between a first position in which said tongue latch means is unaffected and a second position in which said tongue latch means is disengaged from said latch tongue;

support means for supporting said movable element in the first position;

resilient means for urging said movable element from the first position to the second position when said movable element is unsupported in the first position;

actuating means having means for connection to said second portion of said safety belt, for causing said movable element to be unsupported in the first position in response to tension in said second portion of said safety belt in excess of a predetermined limit;

timing means for retarding movement of said movable element from the first position to the second position, said timing means including a first variable volume chamber containing a fluid and engaging said movable element, said fluid pressurized as said movable element moves from the first position to the second position, a second variable volume chamber in flow communication with the first variable volume chamber and hermetically sealed therewith, and a porous element disposed between the first and second variable volume chambers providing a flow communication pathway from the first variable volume chamber to the second variable volume chamber, the porous element having a multitude of tortuous flow paths therethrough.

2. The automatic release buckle assembly of claim 1, in which said porous element is composed of sintered brass powder.

3. The automatic release buckle assembly of claim 1, in which said actuating means includes resilient means in opposition to said tension in said second portion of said safety belt for determining the tension limit at which said actuating means responds.

4. The automatic release buckle mechanism of claim 1, and further including manually operable means for resetting said movable element from the second position to the first position with said movable element supported by said support means.

5. The automatic release buckle mechanism of claim 1, in which said timing means further includes a flow communication pathway from the second variable volume chamber to the first variable volume chamber having a flow resistance less than the flow resistance of said porous element, whereby said timing means can be quickly reset.

6. The automatic release buckle mechanism of claim 5, in which the flow communication path from the second variable volume chamber to the first variable volume chamber includes a check valve.

7. The automatic release buckle mechanism of claim 6, in which the check valve includes an aperture through said porous element, a valve seat about the aperture and a check valve ball mating with valve seat.

8. In an automatic release buckle assembly having means for automatically releasing the buckle assembly after a time delay following an application of tension to the buckle in excess of a predetermined limit, the improvement in combination therewith comprising:

a first variable volume chamber containing a fluid;

a second variable volume chamber in flow communication with the first variable volume chamber and hermetically sealed therewith;

a porous element disposed between the first and second variable volume chambers providing a flow communication pathway from the first variable volume chamber to the second variable volume chamber, the porous element having a multitude of tortuous flow paths therethrough; and, means for pressurizing the fluid in the first variable volume chamber.

9. The automatic release buckle assembly of claim 8, in which said porous element is composed of sintered brass powder.

* * * * *